United States Patent
Jang et al.

(10) Patent No.: US 7,095,237 B2
(45) Date of Patent: Aug. 22, 2006

(54) METHOD OF GROUPING SINGLE CELLS OF POWER SOURCES TO BUILD OPTIMAL PACKS USING PARAMETERS OBTAINED BY ANALYSIS OF IMPEDANCE SPECTRUM

(75) Inventors: Jee-Hwan Jang, Daejeon (KR); Hyun-Kyung Sung, Daejeon (KR); Yevgen Barsukov, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 627 days.

(21) Appl. No.: 10/216,125

(22) Filed: Aug. 9, 2002

(65) Prior Publication Data

US 2003/0041445 A1 Mar. 6, 2003

(30) Foreign Application Priority Data

Sep. 3, 2001 (KR) ................ 2001-53797

(51) Int. Cl.
*G01N 27/416* (2006.01)
(52) U.S. Cl. ........................... 324/433; 324/430
(58) Field of Classification Search .......... 324/430, 324/427, 433, 434; 702/57, 60, 63
See application file for complete search history.

(56) References Cited

U.S. PATENT DOCUMENTS

| | | | |
|---|---|---|---|
| 3,808,487 A | 4/1974 | Feuillade | |
| 3,873,911 A | 3/1975 | Champlin | |
| 3,984,762 A | 10/1976 | Dowgiallo, Jr. | |
| 4,259,639 A | 3/1981 | Renirie | |
| 4,743,855 A | 5/1988 | Randin et al. | |
| 5,241,275 A | 8/1993 | Fang | |
| 6,118,275 A | 9/2000 | Yoon et al. | |
| 6,208,147 B1 * | 3/2001 | Yoon et al. | 324/430 |
| 6,674,287 B1 * | 1/2004 | Jang et al. | 324/430 |

FOREIGN PATENT DOCUMENTS

EP 0119547 A1 9/1984

\* cited by examiner

*Primary Examiner*—Adolf Deneke Berhane
*Assistant Examiner*—Alexis Boateng
(74) *Attorney, Agent, or Firm*—Davidson, Davidson & Kappel, LLC

(57) ABSTRACT

A method for selecting unit cells to make an optimal battery pack improves the performance of the battery pack with primary or secondary batteries connected to one another in series, in parallel, or in a combination of them. The method for selecting unit cells to make the optimal battery pack includes measuring the impedance spectrum of the individual unit cells in a predetermined frequency region, fitting the impedance spectrum to an equivalent circuit model composed of parameters including resistance and capacitance components, calculating total resistances from the fitted parameters, and making the battery pack with unit cells of a similar total resistance.

10 Claims, 8 Drawing Sheets

METHOD OF GROUPING SINGLE CELLS OF POWER SOURCES TO BUILD OPTIMAL PACKS USING PARAMETERS OBTAINED BY ANALYSIS OF IMPEDANCE SPECTRUM

BACKGROUND OF THE INVENTION

1. Field of the Invention

The present invention relates to an unit cell grouping method and a battery pack configuration and, more particularly, to a method for optimizing selection of unit cells to make a battery pack so as to secure good performance of the battery pack with primary or secondary batteries connected to one another in series, in parallel or in combination of them.

2. Related Prior Art

As is well known in the art, in order to secure good performance of a battery pack, it is desirable to select unit cells of a similar performance characteristic in the manufacture of the battery pack with unit cells connected to one another in series, in parallel, or in combination of them. However, the general method of evaluating a battery pack based on the initial capacity is unsatisfactory for securing the similarity for the unit cells of the battery pack, because the unit cells of the same capacity may be different from one another in aging speed and internal characteristic, such as resistance. A battery pack, if configured with parallel unit cells of a different internal characteristic, may encounter an overload on the unit cell having a smaller resistance during a discharge. This means that a current higher than a predetermined current value is flowing to the cell to rapidly shorten the battery life. Namely, in the battery pack with parallel unit cells of a different internal characteristic, the unit cells are equally deteriorated in performance due to the unit cell having a higher resistance. In case of a battery pack with serial unit cells of a different internal characteristic, the cell of a higher resistance has a higher voltage and causes rapid aging due to a voltage difference from the other cells. Such a rise of voltage keeps going and, without a separate protection circuit, may result in explosion of the battery pack.

Until now, the measurement of impedance has been adapted to sort out defective unit cells. For example, the measurement of impedance at a fixed frequency for a short time of less than one second as disclosed in U.S. Pat. No. 3,873,911 can be employed for detection of unit cells having a lower capacity than the average value. But the measurement of impedance at a fixed high frequency cannot always predict the accurate capacity of the unit cells. This is because the individual unit cells have a different tendency to increase the impedance in the low frequency region, which means that the unit cell of high impedance at 1 kHz may exhibit a low impedance value in the low frequency region.

The method of selecting unit cells to make a battery pack based on the measurement of open circuit voltage may also present erroneous results, because the open circuit voltage does not represent the accurate internal characteristic of the unit cells and varies insensitively according to the discharge state of the unit cells.

For quality control of the batteries to sort out defective batteries, many methods for analyzing the impedance spectrum of batteries have been proposed. These methods are based on the measurement of dynamic resistance at a fixed frequency (U.S. Pat. No. 3,873,911); variations of voltage and capacity during a discharge (European Patent No. 0119547); response signals fed back from a battery upon applying a charging signal (U.S. Pat. No. 3,808,487); difference of phase between AC voltage across the battery and the AC current applied to the battery (U.S. Pat. No. 3,984,762); the measurement of internal resistance of lithium-iodine batteries (U.S. Pat. No. 4,259,639); difference of argument between impedance values measured at two different frequencies (U.S. Pat. No. 4,743,855); the measurement of angle built by straight line between impedance point at several frequencies in Real vs. Imaginary part plot (Nyquist plot) (U.S. Pat. No. 5,241,275); and the analysis of parameters obtained by fitting impedance spectrum to an equivalent circuit model (U.S. Pat. No. 6,208,147).

These conventional methods have the same problem in that only a part of the information regarding the internal characteristics of the battery obtained from the measurement can be used for the selection of batteries in such a simple way as to determine the quality of the battery as "good" or "defective". As disclosed in U.S. Pat. No. 6,118,275, for example, the voltage response to current pulse measured for one second with 1 millisecond sampling rate has information about impedance at five different frequencies. Impedance of each frequency has its own unique information about the system. However, only 1 frequency is used for correlation in the prior art, and the other information is lost.

Another problem with these methods lies in the fact that the impedance measurements at a particular frequency are applied to the analysis by mixed state without being separated into capacitance and resistance components and are difficult to use in the fine grouping of the unit cells.

The present invention relating to the selection and grouping of unit cells for a battery pack takes all the frequency regions of the measured impedance spectrum into consideration in the impedance analysis. Also, the present invention fits the impedance spectrum to a physically adequate equivalent circuit model to separate the internal characteristic of the unit cells into resistance and capacitance components and to secure perfect determination of the internal characteristic in connection with the power characteristic of the unit cells. The resistance component as used herein may be approximated to the total DC resistance of the cell corresponding to the resistance during a discharge at a predetermined current.

SUMMARY OF THE INVENTION

It is an object of the present invention to provide a method for optimizing fine grouping and selection of unit cells to make a battery pack, the unit cells being selected based on their previous capacity.

It is another object of the present invention to provide a method for optimizing selection of unit cells to make a battery pack by sorting into the same group the unit cells of a similar total resistance as determined from impedance spectra analysis so as to optimize the performance of the battery pack.

To achieve the objects of the present invention, there is provided a method for optimizing selection of unit cells to make a battery pack that includes (a) measuring impedance spectra for a statistically significant number of power sources in a sufficiently wide frequency region; (b) fitting the measured impedance spectra to a known impedance function of an equivalent circuit model and determining the resistance and capacitance components of the equivalent circuit model; (c) calculating a total resistance using one or more parameters obtained by fitting; and (d) sorting the unit cells into several groups based on the similarity of the total resistance.

More specifically, the present invention involves fitting the impedance data of unit cells measured in the frequency region of 10 kHz to 0.1 Hz according to the method as disclosed in U.S. patent application Ser. No. 09/746,452 using an adequate analysis software, grouping the unit cells by the total resistance that is the sum of different resistance parameters, and making a battery pack with the unit cells of a same group, thereby securing good performance (e.g., high energy density, power and long battery life) of the battery pack.

The present invention employs a non-destructive evaluation method that takes about 20 seconds for the measurement and analysis to make a battery pack with unit cells of a similar internal performance characteristic, which time is much shorter than one hour required for the case of determining direct discharge capacity and energy by a real discharge test of 1C rate.

The present invention provides a method of grouping unit cells for a battery pack configuration by measuring at least two parameters by an indirect and non-destructive evaluation method for understanding the internal performance characteristic of electrochemical power sources, such as impedance measurement, determining a correlation between the sum of the parameters and the internal performance characteristic of the power sources, sorting the power sources of a similar internal performance characteristic into a same group based on the correlation, and making a battery pack with the power sources of a same group. This method is more efficient relative to the destructive evaluation method taking a long time for measurement, such as a real-time discharge method, and more reliable to make a battery pack of higher performance, compared with the correlation method using a single parameter.

DETAILED DESCRIPTION OF THE INVENTION

Hereinafter, the operation of the preferred embodiment of the present invention will be described in detail with reference to FIGS. 1A to 5C.

Figure 1A:
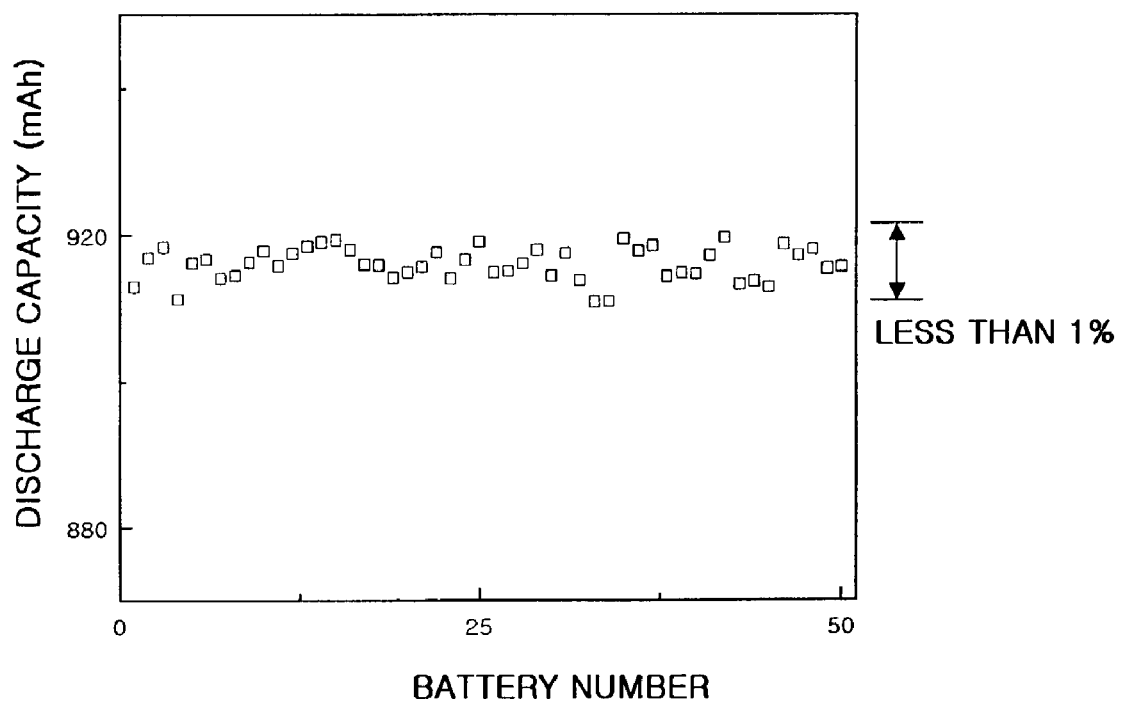
FIG. 1A is a graph showing a comparison of initial discharge capacity among fifty prismatic lithium-ion batteries according to an embodiment of the present invention.
Figure 1B:
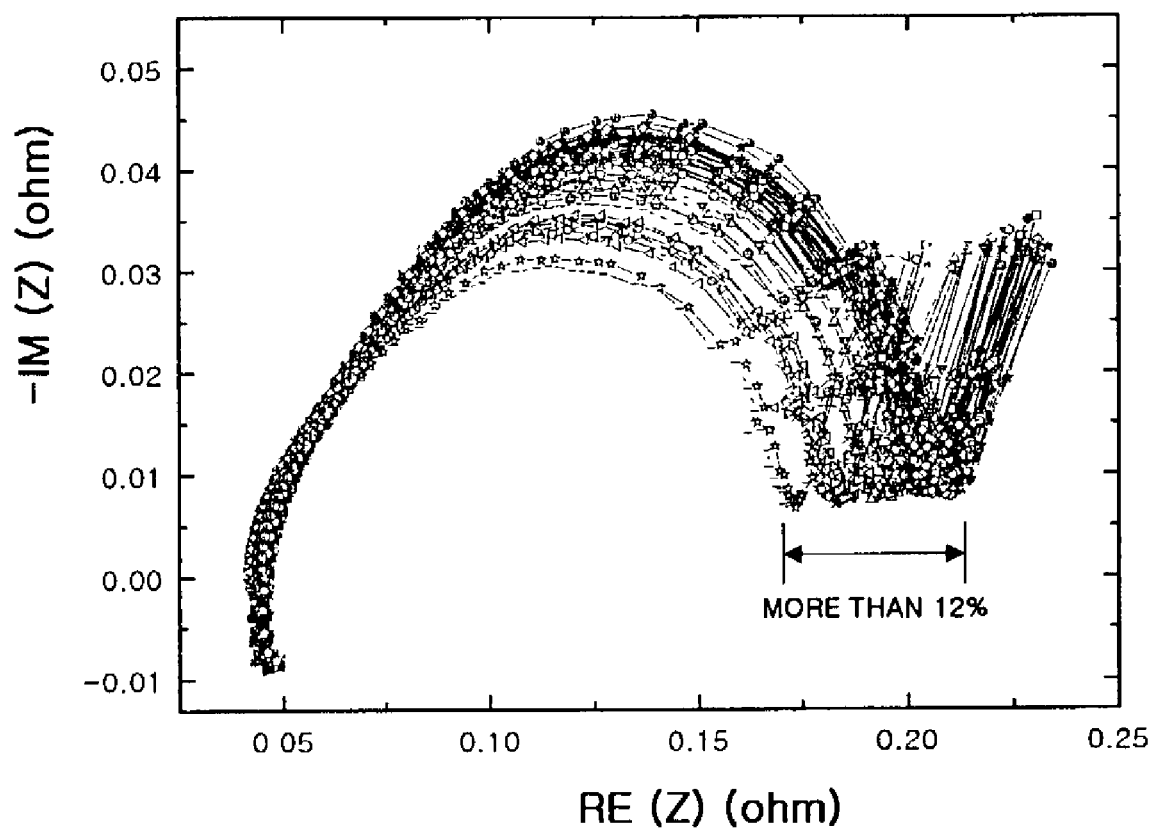
FIG. 1B is a graph showing a comparison of impedance spectrum in the frequency region from 10 kHz to 0.1 Hz among prismatic lithium-ion batteries according to an embodiment of the present invention.

(a) Fifty prismatic lithium-ion batteries produced by the same manufacturing process but having different performance characteristics were analyzed in regard to complex impedance at sixty different frequencies between 10 kHz and 0.1 Hz. The measurement results are presented in FIG. 1B. The impedance measurement was performed with a battery diagnosis system (Powergraphy™, Model Name: BPS 1000FL) manufactured by Korea Kumho Petrochemical Co., Ltd. The fifty prismatic lithium-ion batteries used herein have different discharge capacity value for 1C discharge, as shown in FIG. 1A. The measurement of impedance employs the method disclosed in U.S. patent application Ser. No. 09/746,452, which uses, for example, the multi-sine wave Fourier transformation impedance spectrum measurement or the transient response Laplace transformation impedance spectrum measurement.

Figure 2:
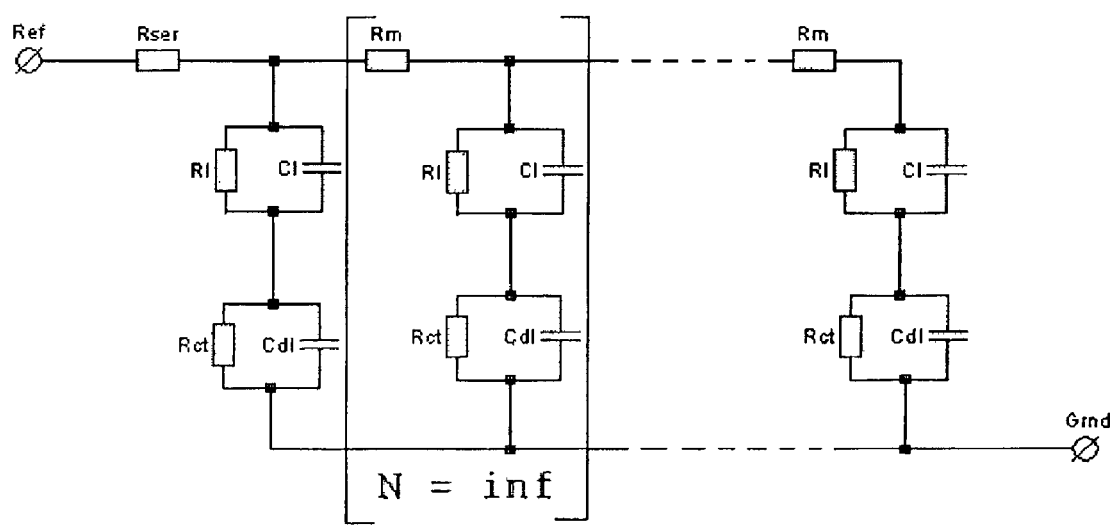
FIG. 2 is an equivalent circuit model diagram of a battery according to an embodiment of the present invention.

(b) The impedance spectrum curves obtained for the fifty prismatic lithium-ion batteries in the step (a) were fitted to the equivalent circuit model shown in FIG. 2. The equivalent circuit model as used herein was selected to optimize the fitting of the measured impedance spectra. The equivalent circuit model as used in the embodiment of the present invention is a 2RC model composed of five parameters physically related to the batteries, including resistance components $R_{SER}$, $R_1$ and $R_2$ and capacitance components $C_1$ and $C_2$. These five parameters can be calculated by a fitting method based on the fitting of the above-mentioned impedance spectrum curves to the battery equivalent circuit model by a non-linear least square method. According to the present invention, the equivalent circuit model is not specifically limited to the 2RC model and may include polynomial RC models represented by nRC (where n is an integer ranging from 1 to n). The impedance function of the battery equivalent circuit model used in the approximation fitting is given by:

$$Z(f) = \frac{1}{\frac{1}{R_1} + i \cdot C_1 \cdot f \cdot 2\Pi} + \frac{1}{\frac{1}{R_2} + i \cdot C_2 \cdot f \cdot 2\Pi} + R_{SER} \quad \text{[Equation 1]}$$

In addition, the battery equivalent circuit model used in the fitting was designed such that the measured impedance spectra have an optimal extrapolation value at a frequency of 0 Hz.

(c) Among the five parameters obtained by the impedance data fitting for the 2RC equivalent circuit model used in the step (b), three resistance parameters, i.e., $R_{SER}$, $R_1$ and $R_2$ were added up to calculate the mathematical sum of the three parameters (total resistance, i.e., DC approximation resistance as the real value of the impedance data at 0 Hz) for the individual fifty batteries.

Figure 3:
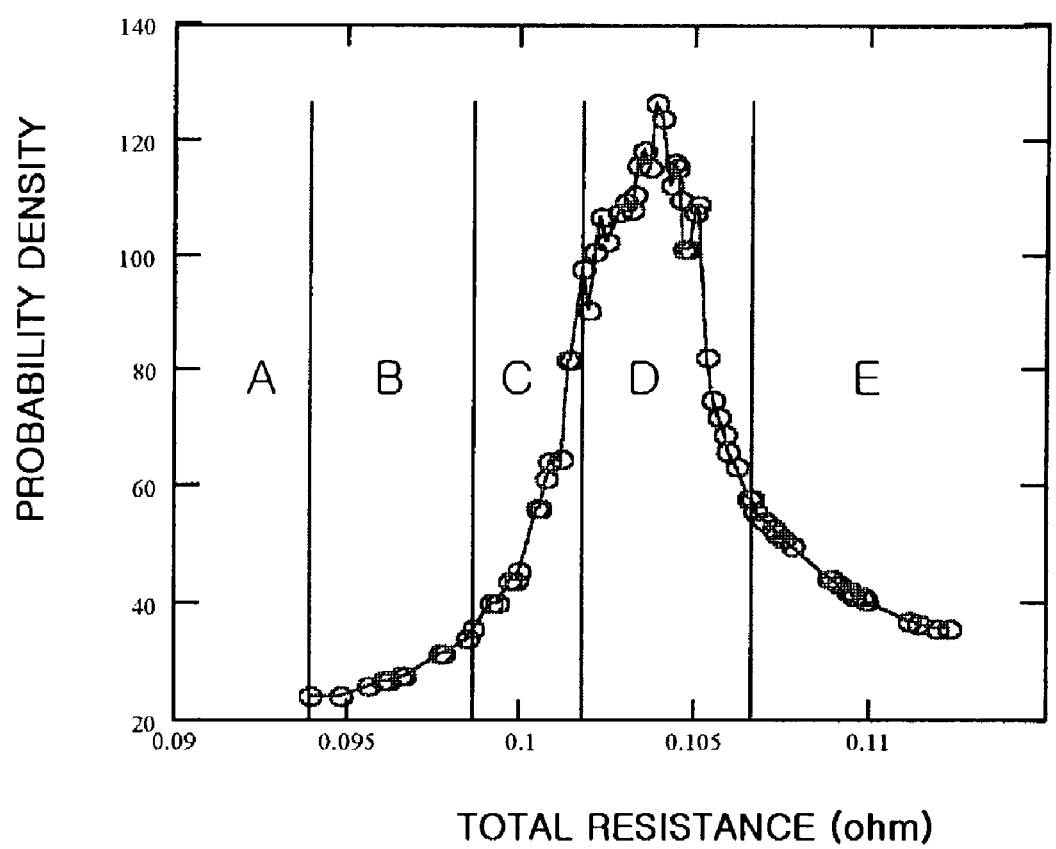
FIG. 3 is a diagram showing the probability distribution of the total resistances calculated based on the impedance analysis of fifty prismatic lithium-ion batteries according to an embodiment of the present invention, in which the difference among the total resistances is about 12% and each boundary between the groups of battery is denoted by a vertical line.
Figure 4:
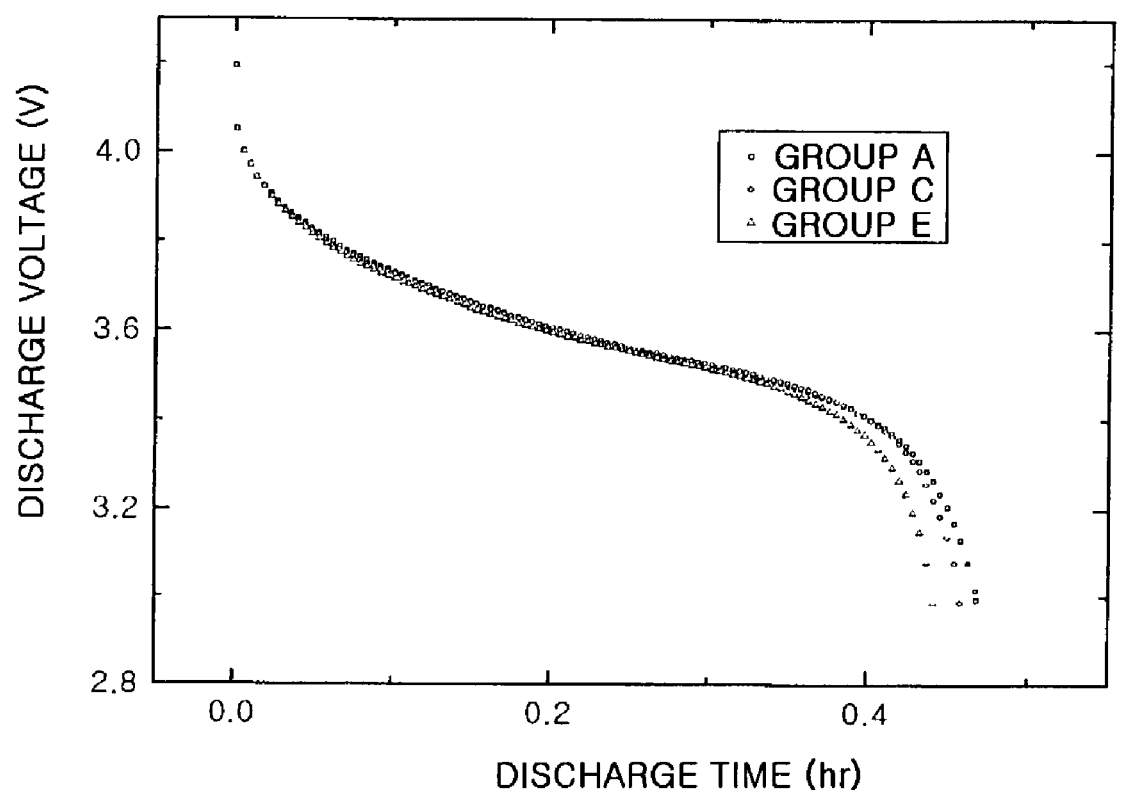
FIG. 4 is a graph showing a comparison of 2C discharge curves for batteries belonging to the groups A, C and E according to an embodiment of the present invention, in which the groups A, C and E are selected from the groups A to E classified by the internal characteristics of battery.
Figure 5A:
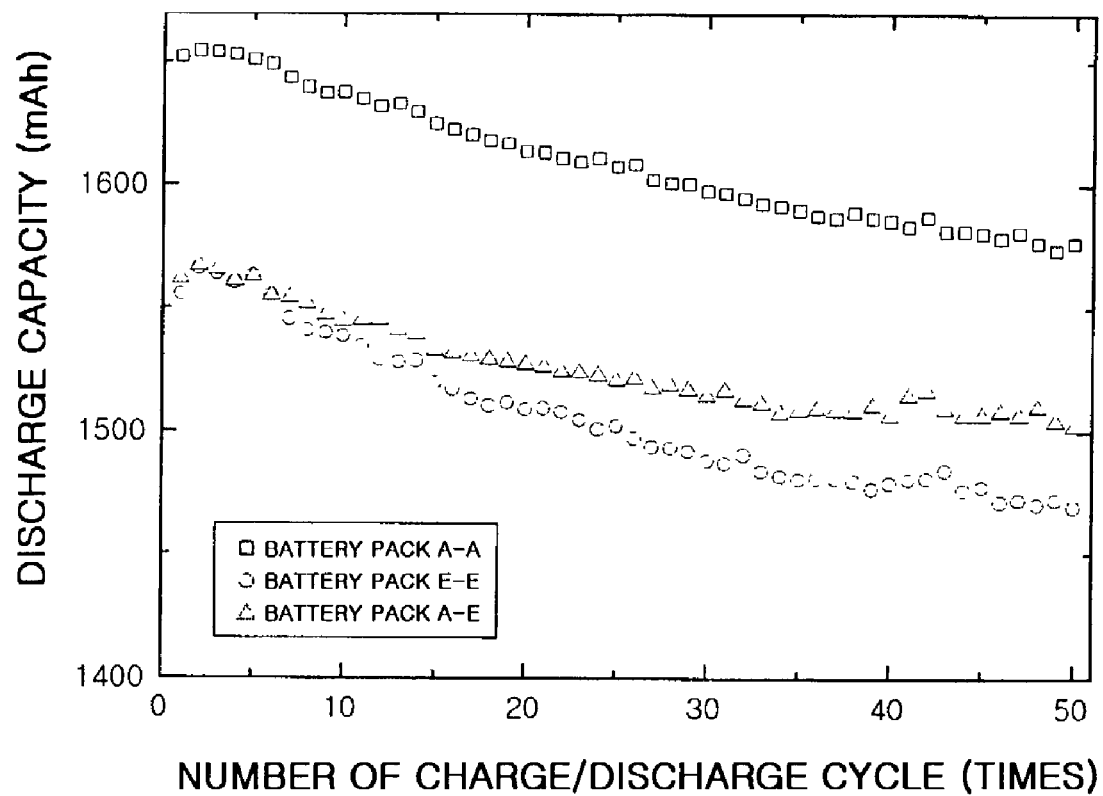
FIG. 5A is a graph showing a comparison of discharge capacity reduced according to the charge/discharge cycling among the battery packs A—A, E—E and A–E with parallel connection of unit cells.
Figure 5B:
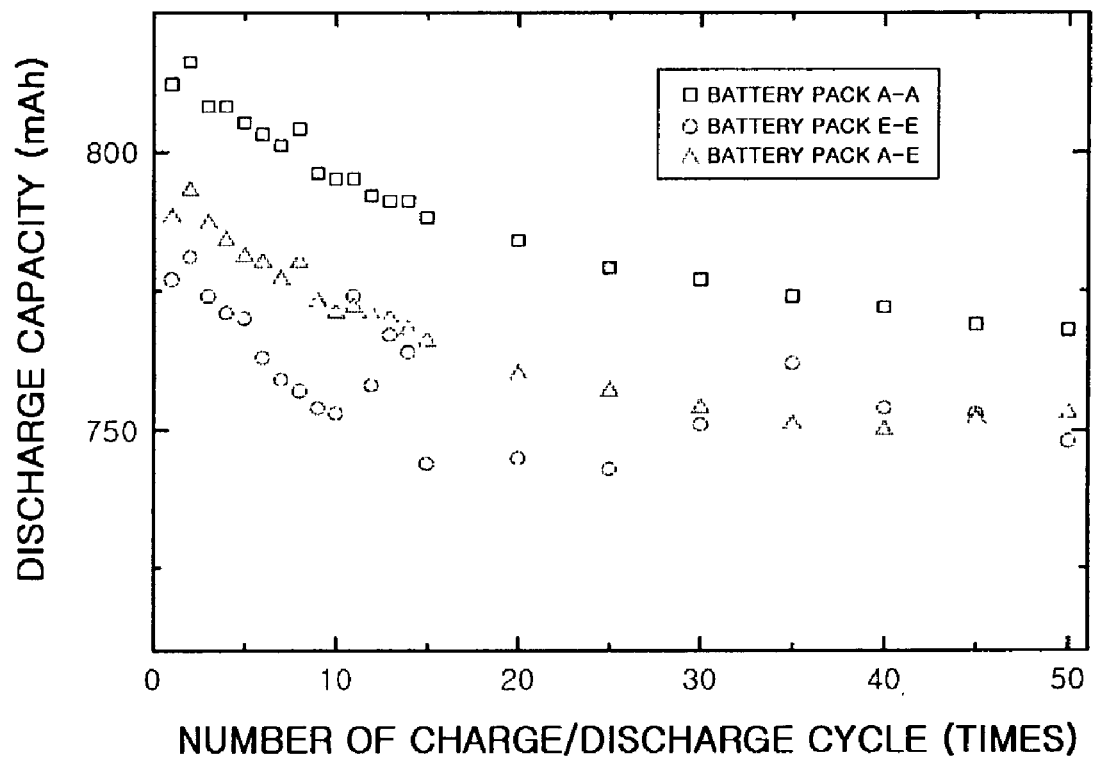
FIG. 5B is a graph showing a comparison of discharge capacity reduced according to the charge/discharge cycling among the battery packs A—A, E—E and A–E with serial connection of unit cells.
Figure 5C:
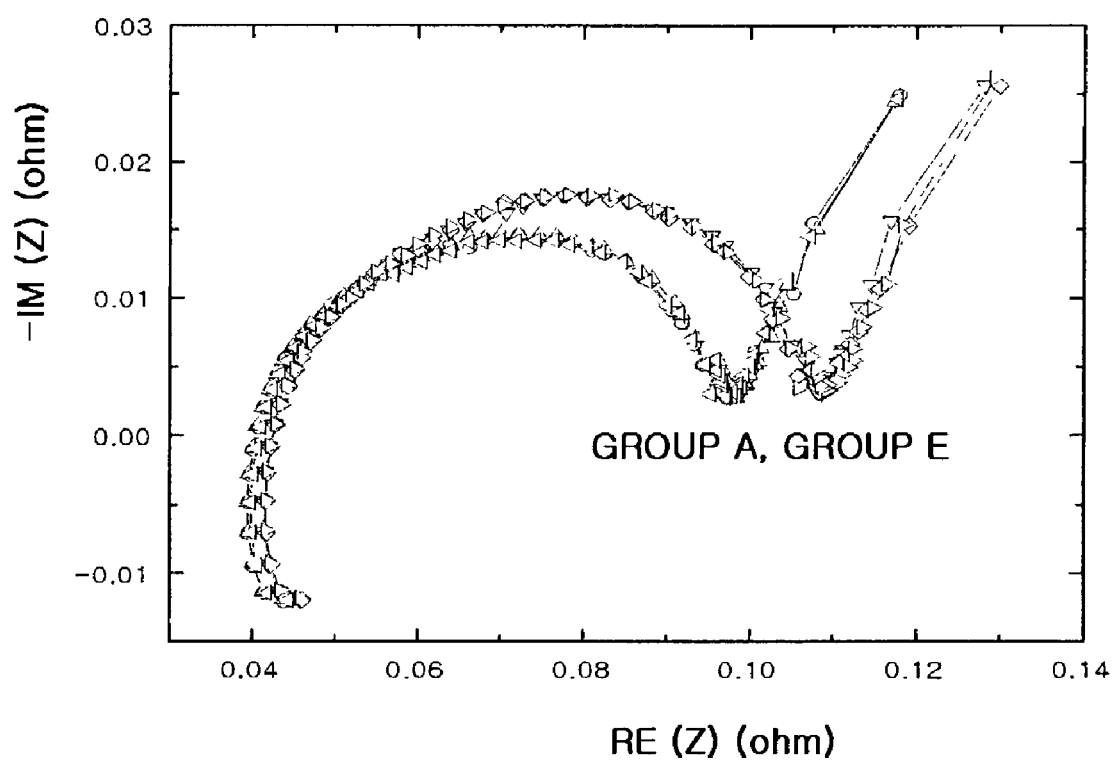
FIG. 5C is a graph showing a comparison of initial impedance spectrum among the batteries of A and E groups used for the serial and parallel connection of battery pack configurations.

(d) The probability density according to total resistance was determined based on the total resistances obtained for the individual fifty batteries in the step (c). The probability density for the fifty batteries having a given total resistance is shown in FIG. 3. The width of the probability density distribution of the total resistance is about 12%, which distribution is much wider than the capacity distribution (less than 1%) obtained by the real-time discharge method for the actual batteries shown in FIG. 1A. This reveals that this method of quality control for the batteries using the total resistances of such a wide distribution is superior to the method based on the actual discharge capacity. As shown in FIG. 3, the batteries were sorted into five groups A to E according to the total resistance. A denotes the group of the smallest total resistance, and B denotes the group of the largest total resistance. The actual 2C real-time discharge curves for the batteries in the groups A, C and E are shown in FIG. 4. Referring to FIG. 4, the discharge capacity and the energy value are highest for the batteries in group A having the smallest total resistance. The batteries in the five individual groups had a very similar internal performance characteristic and were selected to make one battery pack.

(e) To demonstrate that the battery pack with batteries of the same group has the most efficiency and a low loss of energy and capacity, serial and parallel connection of battery, packs were made with two batteries both in group A having the smallest total resistance; both in group E having the largest total resistance; or one of each in groups A and E. The impedance measurements for the batteries in the individual groups A and E used for the battery pack configuration are presented in FIG. 5C. The three battery packs are denoted as A—A, E—E and A–E, respectively. Here, the unit cells in group A have a good internal characteristic, and those in group E have a poor internal characteristic. The results of charge/discharge for the serial and parallel connection of battery packs of the three different group combinations are presented in FIGS. 5A and 5B. According to FIGS. 5A and 5B, the battery pack A—A is much superior to the battery packs E—E and A-E in performance characteristic according to continuous charge/discharge test. The battery pack A–E including one unit cell of group A having a good internal characteristic is similar in performance to the battery pack E—E. This means that the performance of the battery pack is largely dependent upon the unit cell of the inferior internal characteristic. Namely, the battery pack configuration that includes a unit cell of good internal characteristic in combination with a unit cell of poor internal characteristic may have a deterioration of the performance due to the performance characteristic of the defective unit cell. It is thus desirable to make a battery pack with unit cells of a similar internal characteristic in a same group, i.e., A—A, B—B, C—C, D—D or E—E, so as to prevent a deterioration of the performance due to the relatively inferior unit cell.

As described above, the present invention provides a method of grouping unit cells for a battery pack configuration by measuring at least two parameters by an indirect and non-destructive evaluation method for understanding the internal performance characteristic of electrochemical power sources, such as impedance measurement, determining a correlation between the sum of the parameters and the internal performance characteristic of the power sources, grouping the power sources of a similar internal performance characteristic based on the correlation, and making a battery pack with the power sources of a same group, which method is more efficient relative to the destructive evaluation taking a long time for measurement, such as a real-time discharge method, and more reliable to make a battery pack of a higher performance, compared with the correlation method using a single parameter.

Moreover, the present invention remarkably enhances the accuracy and reliability of the prediction of the internal performance characteristic for power sources and shortens the evaluation time required for the measurement and analysis of the power sources.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An optimization method for selection of unit cells using impedance measurement and analysis to make a battery pack, the method comprising:
   (a) calculating at least two parameters by an indirect and non-destructive testing for understanding the internal performance characteristic of electrochemical power sources;
   (b) determining a correlation between the sum of the parameters and the internal performance characteristic of the power sources; and
   (c) sorting the power sources of a similar internal characteristic into the same group based on said correlation to make the battery pack.

2. The method as claimed in claim 1, wherein the electrochemical power sources include primary battery, fuel cell, secondary battery including lithium-ion battery, lithium-ion polymer, lithium polymer, NiCd, NiMH or lead acid battery.

3. The method as claimed in claim 1, wherein the parameters are determined by a fitting method involving linear or non-linear fitting to the equivalent circuit model.

4. An optimization method for selection of unit cells using impedance measurement and analysis to make a battery pack, the method comprising:
   (a) measuring complex impedances at different frequencies in a predetermined frequency range for power sources of a different internal performance characteristic;
   (b) doing approximation fitting of the impedance spectrum curve measured in step (a) to a defined impedance function of the equivalent circuit model of power sources to determine several parameters as separated into resistance and capacitance components;
   (c) determining, for the individual power sources, one or more total resistances (a DC approximation resistance as the real value of impedance data at a frequency of 0 Hz) corresponding to the resistance component determined in step (b); and (d) calculating a probability density distribution of the power sources by the total resistances, based on the total resistances determined for the individual power sources in step (c), and sorting the power sources of a similar internal performance characteristic into the same group to make the battery pack.

5. The method as claimed in claim 4, wherein the electrochemical power sources include primary battery, fuel cell, secondary battery including lithium-ion battery, lithium-ion polymer, lithium polymer, NiCd, NiMH or lead acid battery.

6. The method as claimed in claim 4, wherein the measurement in step (a) includes a multi-sine wave Fourier transformation impedance spectrum measurement.

7. The method as claimed in claim 4, wherein the measurement in step (a) includes a transient response Laplace transformation impedance spectrum measurement.

8. The method as claimed in claim 4, wherein the equivalent circuit model includes an nRC component model.

9. The method as claimed in claim 4, wherein the total resistance is a DC approximation resistance as the real value of impedance data at a frequency of 0 Hz.

10. The method as claimed in claim 4, wherein the battery pack comprises the power sources of a same group based on the probability density distribution of the total resistances.

* * * * *